United States Patent [19]

Okuyama et al.

[11] Patent Number: 5,700,745
[45] Date of Patent: Dec. 23, 1997

[54] DIELECTRIC CERAMIC COMPOSITIONS AND DIELECTRIC RESONATORS

[75] Inventors: Kojiro Okuyama, Nara; Koji Shimoyama, Hyogo; Syunichiro Kawashima, Kyoto; Koichi Kugimiya, Osaka, all of Japan

[73] Assignee: Matsushita Electric Industrial Co. Ltd., Osaka, Japan

[21] Appl. No.: 559,135

[22] Filed: Nov. 17, 1995

[30] Foreign Application Priority Data

Nov. 22, 1994 [JP] Japan ................. 6-288286
Nov. 13, 1995 [JP] Japan ................. 7-294613

[51] Int. Cl.⁶ .............. C04B 35/49; C04B 35/462; C04B 35/465
[52] U.S. Cl. .............. 501/134; 501/135; 501/136; 501/137; 501/138; 313/219.1
[58] Field of Search .............. 501/134, 135, 501/136, 137, 138; 333/219.1

[56] References Cited

U.S. PATENT DOCUMENTS

| | | | |
|---|---|---|---|
| 4,665,041 | 5/1987 | Higuchi et al. | 501/134 |
| 4,785,375 | 11/1988 | Campbell | 501/134 |
| 5,084,424 | 1/1992 | Abe et al. | 501/137 |
| 5,132,258 | 7/1992 | Takahashi et al. | 501/134 |
| 5,264,402 | 11/1993 | Sano et al. | 501/137 |
| 5,322,828 | 6/1994 | Sano et al. | 501/137 |
| 5,356,843 | 10/1994 | Okuyama et al. | 501/134 |
| 5,470,808 | 11/1995 | Okuyama et al. | 501/134 |
| 5,948,767 | 8/1990 | Ushida et al. | 501/134 |

FOREIGN PATENT DOCUMENTS

| | | |
|---|---|---|
| 0 587 140 | 3/1994 | European Pat. Off. . |
| 2 581 639 | 5/1986 | France . |
| 2 223 491 | 12/1973 | Germany . |
| 39 15 339 | 5/1988 | Germany . |
| 0017698 | 2/1977 | Japan ................. 501/134 |
| 02192460 A | 7/1990 | Japan . |

OTHER PUBLICATIONS

Levin et al., Phase Diagrams for Ceramists, 1975 Supplement, p. 169, 1975.

*Primary Examiner*—Mark L. Bell
*Assistant Examiner*—David Sample
*Attorney, Agent, or Firm*—Merchant, Gould, Smith, Edell, Welter & Schmidt, P.A.

[57] ABSTRACT

The present invention provides dielectric ceramics with less variation of temperature coefficient at a resonant frequency due to heating history during the sintering of $ZrTiO_4$ and $ZrO_2$—$SnO_2$—$TiO_2$ ceramics, and having a high unloaded Q value and a high dielectric constant, and a temperature coefficient at a resonant frequency which is widely variable as desired, and dielectric resonators using the dielectric ceramics which have a high unloaded Q value and a strong electrode layer. The main components of the dielectric ceramics may be expressed by the formula: $xZrO_2$—$yTiO_2$—$zA_{(1+u)y/3}B_{(2-u)y/3}O_2$ wherein A denotes at least one component selected from the group (A) consisting of Mg, Co, Zn, Ni and Mn, B denotes at least one component selected from the group (B) consisting of Nb and Ta, and x, y, z and u (x, y and z are molar fractions and u is a value within the range from 0 to 1.90) have the relation of $x+y+z=1.0$, $0.10 \leq x \leq 0.60$, $0.20 \leq y \leq 0.60$, $0.01 \leq z \leq 0.70$. The main component may include, as accessory components, at least one component selected from the group (C) consisting of Ba, Sr, Ca, Cu, Bi and W at 0.005 to 7.000% by weight of the entire weight of the ceramic.

9 Claims, 1 Drawing Sheet

DIELECTRIC CERAMIC COMPOSITIONS AND DIELECTRIC RESONATORS

FIELD OF THE INVENTION

This invention relates to dielectric ceramics and dielectric resonators for use in such high-frequency ranges as microwave and millimeter-wave frequencies.

Recently, dielectric ceramics have been widely used in dielectric resonators and filters in microwave and millimeter-wave frequencies at wavelengths of several centimeters or less (hereinafter referred to as microwave in general). It is required that a dielectric material for use in such applications have a high unloaded Q (Qu) value and dielectric constant $\epsilon_r$, and that the temperature coefficient at a resonant frequency $\tau_f$ be variable as desired. The Q value is the inverse of an inductive loss tan δ.

Various materials appropriate for use in such applications have been conventionally reported, among which $ZrTiO_4$ ceramics are included. Also included in such materials are $ZrO_2$—$SnO_2$—$TiO_2$ ceramics, the $ZrO_2$—$SnO_2$—$TiO_2$—$MgO$ ceramic suggested in Japanese Laid-Open Patent No. 62-132769 and the $ZrO_2$—$SnO_2$—$TiO_2$—$CoO$-$Nb_2O_5$ ceramic in Japanese Laid-Open Patent No. 2-192460, for example.

However, although the $ZrTiO_4$ ceramics according to the prior art have a high dielectric constant of 45, the temperature coefficient at a resonant frequency is high in the positive side at 54ppm/° C., and the temperature coefficient at a resonant frequency is significantly varied by the heating history during sintering. The $ZrO_2$—$SnO_2$—$TiO_2$ ceramic has achieved a low temperature coefficient of about 0ppm/°C. at a resonant frequency, but the variation of temperature coefficient at the resonant frequency caused by the heating history causes problems. In addition, conventional materials have such problems that the dielectric constant and unloaded Q value are low, and that the temperature coefficient at a resonant frequency cannot be varied as desired. Further, in the case of application to a coaxial resonator having electrodes formed on the surface of the dielectric ceramic, a planar filter and the like, there are problems in that the resonant frequency is easily deviated and the unloaded Q value is decreased when the bond strength of the electrode layer to the dielectric ceramic is low.

SUMMARY OF THE INVENTION

The object of the present invention is to provide $ZrTiO_4$ and $ZrO_2$—$SnO_2$—$TiO_2$ ceramics with less variation of temperature coefficient at a resonant frequency due to heating history during sintering.

It is another object of the present invention to provide dielectric ceramics that have a high unloaded Q value and a high dielectric constant, and have a temperature coefficient at a resonant frequency which is variable as desired.

It is still another object of the present invention to provide dielectric resonators which comprise strong electrode layers having a high unloaded Q value. The subject of the present invention is to achieve one of these objects or to achieve more than two objects at the same time.

In order to achieve the objects described above, the present invention provides a dielectric ceramic comprising as the main component a complex oxide formed of both Zr and Ti, at least one component selected from the group (A) consisting of Mg, Co, Zn, Ni and Mn and at least one component selected from the group (B) consisting of Nb and Ta, and as the accessory components at least one component selected from the group (C) consisting of Ba, Sr, Ca, Cu, Bi and W.

For the present dielectric ceramic, it is preferred that the main component of the dielectric ceramic is expressed by the Formula: $xZrO_2$—$yTiO_2$—$zA_{(1+u)/3}B_{(2-u)/3}O_2$, wherein A denotes at least one component selected from the group (A) consisting of Mg, Co, Zn, Ni and Pin, B denotes at least one component selected from the group (B) consisting of Nb and Ta, and x, y, z and u are present within the range expressed by Formula 1, wherein x, y and z denote molar fractions and u denotes a value expressed by the Formula 1.

| | |
|---|---|
| $x + y + z = 1$ | Formula 1 |
| $0.10 \leq x \leq 0.60$ | |
| $0.20 \leq y \leq 0.60$ | |
| $0.01 \leq z \leq 0.70$ | |
| $0 \leq u \leq 1.90$ | |

According to the dielectric ceramic, it is preferred that the accessory components of the dielectric ceramic are present within the range of 0.005 to 7.000% by weight based on the entire weight of the ceramic. The amount of the accessory component is the weight of an oxide form in which the component is present in the ceramic, and is a value which is changed into {$BaO$, $SrO$, $CaO$, $CuO$, $Bi_2O_3$, $WO_3$}.

Further, it is preferred that the main component comprises a $ZrTiO_4$ or crystallographical $ZrTiO_4$ phase substituted with at least one component selected from the group (A) consisting of Mg, Co, Zn, Ni and Mn and at least one component selected from the group (B) consisting of Nb and Ta.

Preferably, the main component comprises a $ZrTiO_4$ or crystallographical $ZrTiO_4$ phase substituted with at least one component selected from the group (A) consisting of Mg, Co, Zn, Ni and Mn and at least one component selected from the group (B) consisting of Nb and Ta, and a/b (a and b denote the total of molar fractions of the components A and B) ranges from 0.5 to 1.9.

For the present dielectric ceramic, it is preferred that the main component further comprises a complex oxide formed of at least one component selected from the group (D) consisting of Sn, Hf and Ge.

Preferably, the main component of the dielectric ceramic is expressed by the Formula: $xZrO_2$—$yTiO_2$—$zA_{(1+u)/3}B_{(2-u)/3}O_2$—$vDO_2$, wherein A denotes at least one component selected from the group (A) consisting of Mg, Co, Zn, Ni and Mn, B denotes at least one component selected from the group (B) consisting of Nb and Ta, and D denotes at least one component selected from the group (D) consisting of Sn, Hf and Ge, and x, y, z, v, and u are present within the range expressed by Formula 2, wherein x, y, z and v denote molar fractions and u denotes a value expressed by the Formula 2.

| | |
|---|---|
| $x + y + z + v = 1$ | Formula 2 |
| $0.10 \leq x \leq 0.60$ | |
| $0.20 \leq y \leq 0.60$ | |
| $0.01 \leq z \leq 0.50$ | |
| $0.001 \leq v \leq 0.20$ | |
| $0 \leq u \leq 1.90$ | |

Further, it is preferred that the accessory components of the dielectric ceramic comprise at least one component selected from the group (C) consisting of Ba, Sr, Ca, Cu, Bi and W within the range from 0.005 to 7.000% by weight based on the entire weight of the ceramic.

For the present dielectric ceramic, it is preferred that the main component comprises a $ZrTiO_4$ or crystallographical $ZrTiO_4$ phase substituted with at least one component selected from the group (A) consisting of M g, Co, Zn, Ni and Mn, at least one component selected from the group (B) consisting of Nb and Ta, and at least one component selected from the group (D) consisting of Sn, Hf and Ge.

Preferably, the main component comprises a $ZrTiO_4$ or crystallographical $ZrTiO_4$ phase substituted with at least one component selected from the group (A) consisting of Mg, Co, Zn, Ni and Mn, at least one component selected from the group (B) consisting of Nb and Ta, and at least one component selected from the group (D) consisting of Sn, Hf and Ge, and a/b (a and b denote the total of molar fractions of the components A and B) ranges from 0.5 to 1.9.

The dielectric resonator of the present invention is characterized by a dielectric ceramic having the structure described above, and an electrode formed on the surface of the dielectric ceramic.

For the present dielectric resonator, it is preferred that the electrode is copper or silver.

In the structure of the present invention, the main component includes a complex oxide formed of both Zr and Ti, at least one component selected from the group (A) consisting of Mg, Co, Zn, Ni and Mn and at least one component selected from the group (B) consisting of Nb and Ta, and as the accessory components at least one component selected from the group (C) consisting of Ba, Sr, Ca, Cu, Bi and W. Consequently, the present invention provides dielectric ceramics with less variation of temperature coefficient at a resonant frequency due to heating history during the sintering of the $ZrTiO_4$ ceramic.

According to the preferred structure of the composition formula and the Formula 1, the present invention provides dielectric ceramics that have a high unloaded Q value and a high dielectric constant, and have a temperature coefficient at a resonant frequency which is variable as desired.

According to the dielectric ceramic expressed by the composition formula and the Formula 1, the main component comprises a $ZrTiO_4$ or crystallographical $ZrTiO_4$ phase substituted with at least one component selected from the group (A) consisting of Mg, Co, Zn, Ni and Mn and at least one component selected from the group (B) consisting of Nb and Ta. Thus, the present invention provides dielectric ceramics having a higher unloaded Q value and a high dielectric constant, and is superior in thermo-stability at a resonant frequency.

According to the dielectric ceramic expressed by the composition formula and the Formula 1, the main component comprises a $ZrTiO_4$ or crystallographical $ZrTiO_4$ phase substituted with at least one component selected from the group (A) consisting of Mg, Co, Zn, Ni and Mn and at least one component selected from the group (B) consisting of Nb and Ta, and a/b (a and b denote the total of molar fractions of the components A and B) ranges from 0.5 to 1.9. Thus, the present invention provides dielectric ceramics having a much higher unloaded Q value and a high dielectric constant, and is superior in thermo-stability at a resonant frequency.

For the present dielectric ceramics, it is preferred that the main component further comprises a complex oxide formed of at least one component selected from the group (D) consisting of Sn, Hf and Ge. Thus, the present invention provides dielectric ceramics with less variation of temperature coefficient at a resonant frequency due to heating history during the sintering of $ZrO_2$—$SnO_2$—$TiO_2$ ceramics.

For the present dielectric ceramic expressed by the composition formula and the Formula 2, it is preferred that the main component comprises a $ZrTiO_4$ or crystallographical $ZrTiO_4$ phase substituted with at least one component selected from the group (A) consisting of Mg, Co, Zn, Ni and Mn, at least one component selected from the group (B) consisting of Nb and Ta, and at least one component selected from the group (D) consisting of Sn, Hf and Ge. Thus, the present invention provides dielectric ceramics having a higher unloaded Q value and a high dielectric constant, and is superior in thermo-stability at a resonant frequency.

According to the dielectric ceramic expressed by the composition formula and the Formula 2, the main component comprises a $ZrTiO_4$ or crystallographical $ZrTiO_4$ phase substituted with at least one component selected from the group (A) consisting of Mg, Co, Zn, Ni and Mn, at least one component selected from the group (B) consisting of Nb and Ta, and at least one component selected from the group (D) consisting of Sn, Hf and Ge, and a/b (a and b denote the total of molar fractions of the components A and B) ranges from 0.5 to 1.9. Thus, the present invention provides dielectric ceramics having a much higher unloaded Q value and a high dielectric constant, and is superior in thermo-stability at a resonant frequency.

The dielectric resonator of the present invention has a high unloaded Q value and a strong electrode layer.

In the foregoing, the $ZrTiO_4$ or crystallographical $ZrTiO_4$ phase substituted with at least one component of each of the groups A, B and D is a phase in which both or either of Zr and Ti sites are (is) substituted with at least one of each of the groups A, B and D. Basically, the $ZrTiO_4$ phase has an element ratio Zr/Ti=1. Actually, also in a composition area where the element ratio is slightly shifted to the direction which is higher or lower than 1 (for example, in case Zr and Ti are soluble in the $ZrTiO_4$ phase), an area which can be regarded as the $ZrTiO_4$ constitution is present. Such an area is crystallographically referred to as a $ZrTiO_4$ phase.

DETAILED DESCRIPTION OF THE INVENTION

Any compound such as oxide, carbonate, hydroxide, chloride, alkoxide of the component elements described above may be used as an initial material of the dielectric ceramic according to the present invention. As blending methods of powdery raw materials, wet blending for mixing the materials with water or organic solvent in a ball mill and dry blending for mixing them by a mixer or a ball mill, etc. without using any solvent are generally known and any of these methods maybe employed. Alternatively, the alkoxide method and coprecipitation method may be used depending on the initial materials. Because the process is thus comparatively uncomplicated, and a homogeneous mixture can be easily obtained, it is desirable to employ the wet blending method for mixing them in a ball mill by using a solvent, and a dispersing agent may be additionally used for increasing the dispersing property of powders, or pH adjustment may be performed.

Although calcination of the mixture is not required, the sintering time can be reduced by calcination. Although the calcination temperature depends on the particular compositions, it is generally in the order of 1 to 8 hrs at about 700° to 1200° C.

As the milling method for the calcined material or mixture, any suitable method such as using a ball mill, high-speed rotor mill, media agitating mill and jet mill may be employed.

For molding, press molding is generally carried out to obtain a desired shape. Although not specifically limited, the pressure used in the press molding is generally in a range of approximately 0.5 to 2 tone/cm$^2$. A binder used for molding may be a binder used for molding ceramics, such as a polyvinyl alcohol binder, a polyvinyl butylal binder, an acrylic resin binder or a wax binder. Although not specifically limited, the amount of the binder to be used is generally in a range of approximately 0.5 to 1% by weight by solid matter conversion.

Although sintering is not specifically limited, as it depends on the particular compositions and dimensions of the moldings, it is generally desirable to perform firing at a temperature of approximately 400° to 700° C. for about 1 to 24 hrs in order to remove binders, and then, at approximately 1100° to 1650° C. for about 2 to 100 hrs.

Figure 1B:
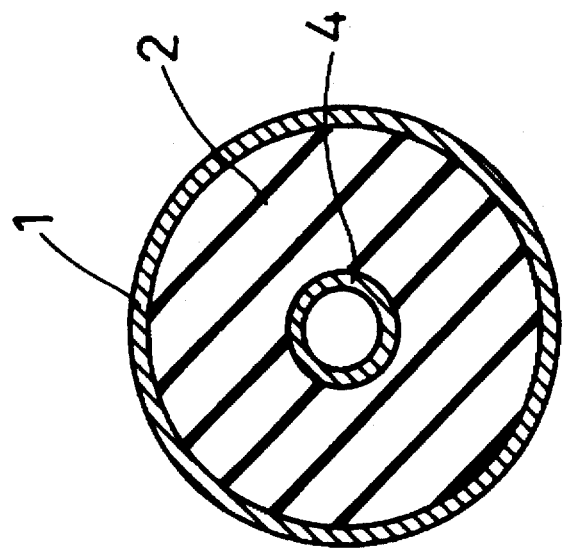
FIG. 1B is a sectional view taken out along the line I—I shown in FIG. 1A.
Figure 1A:
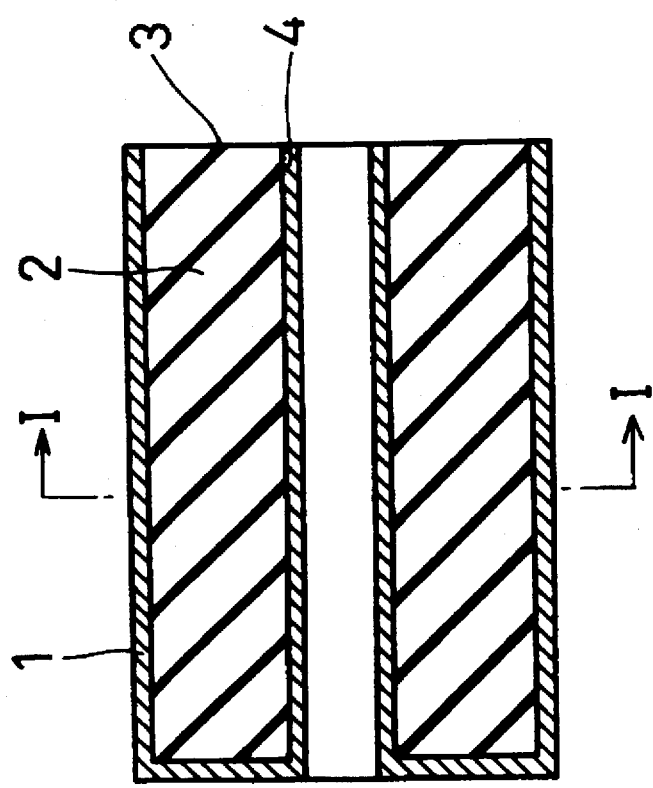
FIG. 1A is a sectional view of a cylindrical coaxial dielectric resonator, which is axially cut off, according to an embodiment of the present invention.

An example of a cylindrical coaxial dielectric resonator will be described with reference to the drawings. FIG. 1A is a sectional view of the cylindrical coaxial dielectric resonator which is axially cut off, in which electrodes 1 and 4 are continuously formed on the surface of a cylindrical dielectric ceramic 2. The electrode is not formed on the surface of an opening end 3. FIG. 1B is a sectional view taken along the line I—I shown in FIG. 1A. According to the cylindrical coaxial dielectric resonator, electromagnetic waves are incident in the direction of the opening end 3, and the resonance (TEM mode) of the electromagnetic waves in a specific frequency area is utilized to obtain the necessary output from the electrodes 1 and 4.

The present invention will be described with reference to the following examples.

EXAMPLE 1

As initial materials, $ZrO_2$, $TiO_2$, MgO, CoO, ZnO, NiO, $Nb_2O_5$, $Ta_2O_5$, $MnCO_3$, $BaCO_3$, $SrCO_3$, $CaCO_3$, CuO, $Bi_2O_3$, $WO_3$, $SnO_2$, $HfO_2$ and $GeO_2$ of high chemical purity (more than 98 wt. %) were used, weighed so as to make predetermined compositions and wet-blended with ethanol by using a ball mill. The volume ratio between the powder and ethanol was approximately 2:3.

The mixture was removed from the ball mill, dried, and calcined for 2 hrs at 1000° C. in the air. The calcined product was wet-milled in the ball mill with ethanol. After the milled slurry was removed from the ball mill and dried, the powder was mixed with 8% by weight of polyvinyl alcohol solution of 6 vol. % in concentration as a binder, homogenized, and granulated by sieving through a 32 mesh screen. The granulated powder was molded into a disk of 7 mm in diameter and approximately 3 mm in thickness by using molds and an oil hydraulic press at a molding pressure of 1.3 ton/cm$^2$.

The molding was placed in a magnesia vessel of high purity, kept in the air at a temperature of 600° C. for 4 hrs to remove binders, then retained in the air at 1200° to 1500° C. for 24 hrs for sintering, and quenched (taken out of a furnace and air-cooled) or slowly cooled down to 1000° C. (at a cooling rate of 20° C./hr) thereafter, and dielectric ceramics were obtained.

The resonant frequency was obtained from measurement by the dielectric rod resonator method. The temperature coefficient at a resonant frequency $\tau_f$ was obtained in a range between −25° C. and 85° C.

The compositions of main components and the amount of accessory components, which are to be added, of the dielectric ceramics thus produced are shown in Tables 1 and 2, respectively. Cooling conditions after sintering and a temperature coefficient at a resonant frequency (ppm/° C.) are shown in Table 3. In Tables 1 to 3, comparative examples have an asterisk.

TABLE 1

| Sample No. | Composition (molar fraction) | | | | | | | | | | | |
|---|---|---|---|---|---|---|---|---|---|---|---|---|
| | Zr | Ti | Mg | Co | Zn | Ni | Mn | Nb | Ta | Sn | Hf | Ge |
| *1,*2 | 0.50 | 0.50 | 0 | 0 | 0 | 0 | 0 | 0 | 0 | 0 | 0 | 0 |
| 3,4 | 0.35 | 0.50 | 0.05 | 0 | 0 | 0 | 0 | 0.10 | 0 | 0 | 0 | 0 |
| 5,6 | 0.35 | 0.50 | 0 | 0.05 | 0 | 0 | 0 | 0.10 | 0 | 0 | 0 | 0 |
| 7,8 | 0.35 | 0.50 | 0.01 | 0.01 | 0.01 | 0.01 | 0.01 | 0.10 | 0 | 0 | 0 | 0 |
| 9,10 | 0.35 | 0.50 | 0.01 | 0.01 | 0.01 | 0.01 | 0.01 | 0.10 | 0 | 0 | 0 | 0 |
| 11,12 | 0.35 | 0.50 | 0.01 | 0.01 | 0.01 | 0.01 | 0.01 | 0.10 | 0 | 0 | 0 | 0 |
| 13,14 | 0.35 | 0.50 | 0.01 | 0.01 | 0.01 | 0.01 | 0.01 | 0.05 | 0.05 | 0 | 0 | 0 |
| *15*16 | 0.40 | 0.50 | 0 | 0 | 0 | 0 | 0 | 0 | 0 | 0.10 | 0 | 0 |
| *17*18 | 0.32 | 0.50 | 0 | 0.03 | 0 | 0 | 0 | 0.05 | 0 | 0.10 | 0 | 0 |
| 19,20 | 0.35 | 0.50 | 0.01 | 0.01 | 0.01 | 0.01 | 0.01 | 0.05 | 0.05 | 0.010 | 0 | 0 |
| 21,22 | 0.35 | 0.50 | 0.01 | 0.01 | 0.01 | 0.01 | 0.01 | 0.05 | 0.05 | 0 | 0.01 | 0 |
| 23,24 | 0.35 | 0.50 | 0.01 | 0.01 | 0.01 | 0.01 | 0.01 | 0.05 | 0.05 | 0 | 0 | 0.01 |
| 25,26 | 0.35 | 0.50 | 0.01 | 0.01 | 0.01 | 0.01 | 0.01 | 0.05 | 0.05 | 0.01 | 0.01 | 0.01 |

TABLE 2

| Sample No. | Amount of additive (wt. %) | | | | | |
|---|---|---|---|---|---|---|
| | Ba | Sr | Ca | Cu | Bi | W |
| *1,*2 | 0 | 0.1 | 0 | 0 | 0 | 0 |
| 3,4 | 0 | 0.1 | 0 | 0 | 0 | 0 |
| 5,6 | 0.1 | 0 | 0 | 0 | 0 | 0 |
| 7,8 | 0 | 0 | 0 | 0 | 0.1 | 0 |
| 9,10 | 0 | 0 | 0 | 0.1 | 0 | 0 |
| 11,12 | 0 | 0 | 0 | 0 | 0 | 0.1 |
| 13,14 | 0.1 | 0.1 | 0.1 | 0.1 | 0 | 0 |
| *15*16 | 0 | 0 | 0 | 0 | 0 | 0 |
| *17*18 | 0 | 0 | 0 | 0 | 0 | 0 |
| 19,20 | 0.1 | 0.1 | 0.1 | 0.1 | 0 | 0 |
| 21,22 | 0.1 | 0 | 0 | 0 | 0 | 0 |
| 23,24 | 0 | 0.1 | 0 | 0 | 0 | 0 |
| 25,26 | 0.1 | 0.1 | 0.1 | 0.1 | 0 | 0 |

TABLE 3

| Sample No. | Cooling condition after sintering | $\tau_f$ (ppm/°C.) |
|---|---|---|
| *1 | Quenching | 58.9 |
| *2 | Slow cooling | 69.1 |
| 3 | Quenching | 8.2 |
| 4 | Slow cooling | 8.9 |
| 5 | Quenching | 5.5 |
| 6 | Slow cooling | 4.8 |
| 7 | Quenching | 9.4 |
| 8 | Slow cooling | 9.3 |
| 9 | Quenching | 9.7 |
| 10 | Slow cooling | 10.1 |
| 11 | Quenching | 9.8 |
| 12 | Slow cooling | 9.6 |
| 13 | Quenching | 9.8 |
| 14 | Slow cooling | 9.7 |
| *15 | Quenching | −5.7 |
| *16 | Slow cooling | 1.2 |
| *17 | Quenching | −22.5 |
| *18 | Slow cooling | −16.3 |
| 19 | Quenching | 5.8 |
| 20 | Slow cooling | 4.2 |
| 21 | Quenching | 0.9 |
| 22 | Slow cooling | 1.2 |
| 23 | Quenching | 9.5 |
| 24 | Slow cooling | 9.9 |
| 25 | Quenching | 8.5 |
| 26 | Slow cooling | 9.7 |

As recognized from the results shown in Table 3, in dielectric ceramics of sample Nos. 3 to 14 and 19 to 26 of the present example, the variation of temperature coefficient at a resonant frequency due to the heating history during sintering of $ZrTiO_4$ and $ZrO_2$—$SnO_2$—$TiO_2$ ceramics is reduced.

EXAMPLE 2

As initial materials, $ZrO_2$, $TiO_2$, $MgO$, $CoO$, $ZnO$, $NiO$, $MnCO_3$, $Nb_2O_5$, $Ta_2O_5$, $BaCO_3$, $SrCO_3$, $CaCO_3$, $CuO$, $Bi_2O_3$, and $WO_3$ of high chemical purity which are the same as in Example 1 were used, weighed so as to make a predetermined compositions and wet-blended with ethanol by using a ball mill. The volume ratio between the powder and ethanol was approximately 2:3.

The mixture was removed from the ball mill, dried, and calcined for 2 to 8 hrs at 800° to 1250° C. in the air. The calcined product was wet-milled in the ball mill with ethanol. After the milled slurry was removed from the ball mill and dried, the powder was mixed with 8% by weight of polyvinyl alcohol solution of 6 vol. % in concentration added thereto as a binder, homogenized, and granulated by sieving through 32 mesh screen. The granulated powder was molded into a disk of 7 mm in diameter and approximately 3 mm in thickness by using molds and an oil hydraulic press at a molding pressure of 1.3 ton/cm².

The molding was placed in a magnesia vessel of high purity, kept in the air at a temperature of 400° to 700° C. for 4 to 8 hrs to remove binders, retained in the air at 1200° C. to 1650° C. for 1 to 100 hrs for sintering, and dielectric ceramics were obtained.

The resonant frequency. unloaded Q (Qu) value and dielectric constant $\epsilon_r$ were obtained from measurement by the dielectric rod resonator method. The temperature coefficient at a resonant frequency $\tau_f$ was obtained in a range between −25° C. and 85° C. The resonant frequency was obtained in a range between 4 GHz and 12 GHz.

The compositions of main components and the amount of accessory components, which are to be added, of the dielectric ceramics thus produced are shown in Table 4. The dielectric constant thus obtained, the temperature at a resonant frequency $\tau_f$ (ppm/° C.) and the unloaded Q value are shown in Table 5. In Tables 4 and 5, comparative examples have an asterisk.

TABLE 4

| Sample No. | Composition of main component A | B | (molar fraction) x | y | z | (value) u | Accessory component | (wt. %) |
|---|---|---|---|---|---|---|---|---|
| *27 | Mg | Nb | 0.400 | 0.150 | 0.450 | 0 | Sr | 0.005 |
| *28 | Co | Nb | 0.400 | 0.150 | 0.450 | 0 | Sr | 0.005 |
| *29 | Zn | Nb | 0.400 | 0.150 | 0.450 | 0 | Ba | 0.005 |
| *30 | Ni | Nb | 0.400 | 0.150 | 0.450 | 0 | Ca | 0.005 |
| 31 | Mg | Nb | 0.200 | 0.200 | 0.600 | 0 | Sr | 1.000 |
| 32 | Co | Nb | 0.200 | 0.200 | 0.600 | 0 | Sr | 1.000 |
| 33 | Ni | Nb | 0.200 | 0.200 | 0.600 | 0 | Sr | 1.000 |
| 34 | Mg | Nb | 0.450 | 0.200 | 0.350 | 0 | Sr | 0.500 |
| 35 | Co | Nb | 0.450 | 0.200 | 0.350 | 0 | Sr | 0.500 |
| 36 | Mg | Nb | 0.200 | 0.600 | 0.200 | 0 | Ba | 0.500 |
| 37 | Zn | Nb | 0.200 | 0.600 | 0.200 | 0 | Ba | 0.500 |
| *38 | Mg | Nb | 0.150 | 0.700 | 0.150 | 0 | Sr | 1.000 |
| *39 | Mg | Nb | 0.150 | 0.120 | 0.730 | 0 | Ba | 0.500 |
| 40 | Mg | Nb | 0.100 | 0.200 | 0.700 | 0 | Ba | 0.500 |
| 41 | Ni | Nb | 0.100 | 0.200 | 0.700 | 0 | Ba | 0.500 |
| *42 | — | — | 0.550 | 0.450 | 0 | 0 | — | 0 |
| 43 | Mg | Nb | 0.490 | 0.500 | 0.010 | 0 | Ba | 0.005 |
| 44 | Co | Nb | 0.490 | 0.500 | 0.010 | 0 | Ba | 0.005 |
| 45 | Zn | Nb | 0.490 | 0.500 | 0.010 | 0 | Ba | 0.005 |
| 46 | Ni | Nb | 0.490 | 0.500 | 0.010 | 0 | Ba | 0.005 |
| 47 | Mg | Nb | 0.300 | 0.300 | 0.400 | 0 | Sr | 1.000 |
| 48 | Mg | Nb | 0.400 | 0.400 | 0.200 | 0 | Sr | 0.005 |
| 49 | Co | Nb | 0.400 | 0.400 | 0.200 | 0 | Sr | 0.005 |
| 50 | Zn | Nb | 0.400 | 0.400 | 0.200 | 0 | Sr | 0.005 |
| 51 | Mg | Nb | 0.340 | 0.520 | 0.140 | 0 | Sr | 0.100 |
| 52 | Co | Nb | 0.340 | 0.520 | 0.140 | 0 | Sr | 0.100 |
| 53 | Zn | Nb | 0.340 | 0.520 | 0.140 | 0 | Sr | 0.100 |
| 54 | Ni | Nb | 0.340 | 0.520 | 0.140 | 0 | Sr | 0.100 |
| 55 | Mg | Nb | 0.450 | 0.450 | 0.100 | 0 | Sr | 0.100 |
| *56 | Mg | Nb | 0.650 | 0.200 | 0.100 | 0 | Ca | 0.100 |
| *57 | Co | Nb | 0.650 | 0.200 | 0.100 | 0 | Ca | 0.100 |
| 58 | Mg | Nb | 0.600 | 0.300 | 0.100 | 0 | Ca | 0.100 |
| 59 | Mg | Nb | 0.100 | 0.400 | 0.500 | 0 | Bi | 0.100 |
| 60 | Ni | Nb | 0.100 | 0.400 | 0.500 | 0 | Bi | 0.100 |
| *61 | Mg | Nb | 0.050 | 0.500 | 0.450 | 0 | Ca | 0.100 |
| *62 | Co | Nb | 0.050 | 0.500 | 0.450 | 0 | Bi | 0.100 |
| 63 | Mg | Nb | 0.450 | 0.350 | 0.200 | 0 | Sr | 1.000 |
| 64 | Mg | Nb | 0.350 | 0.450 | 0.200 | 0 | Sr | 1.000 |
| | | | | | | | Cu | 0.005 |
| 65 | Mg | Nb | 0.350 | 0.450 | 0.200 | 0 | Sr | 1.000 |
| | | | | | | | Cu | 0.100 |
| 66 | Mg | Nb | 0.350 | 0.450 | 0.200 | 0 | Sr | 1.000 |
| | | | | | | | W | 0.005 |
| 67 | Mg | Nb | 0.350 | 0.450 | 0.200 | 0 | Sr | 1.000 |
| | | | | | | | W | 0.100 |
| 68 | Mg | Nb | 0.350 | 0.450 | 0.200 | 0 | Sr | 1.000 |
| | | | | | | | W | 1.000 |
| 69 | Mg | Nb | 0.350 | 0.450 | 0.200 | 0 | Sr | 1.000 |
| | | | | | | | W | 2.000 |
| 70 | Mg | Nb | 0.350 | 0.450 | 0.200 | 0 | Sr | 1.000 |
| 71 | Mg | Nb | 0.350 | 0.450 | 0.200 | 0.01 | Sr | 1.000 |
| 72 | Co | Nb | 0.350 | 0.450 | 0.200 | 0.01 | Sr | 1.000 |
| 73 | Zn | Nb | 0.350 | 0.450 | 0.200 | 0.01 | Sr | 1.000 |
| 74 | Ni | Nb | 0.350 | 0.450 | 0.200 | 0.01 | Sr | 1.000 |
| 75 | Mg | Nb | 0.350 | 0.450 | 0.200 | 0.05 | Sr | 1.000 |
| 76 | Mg | Nb | 0.350 | 0.450 | 0.200 | 0.20 | Sr | 1.000 |
| 77 | Co | Nb | 0.350 | 0.450 | 0.200 | 0.20 | Sr | 1.000 |
| 78 | Mg | Nb | 0.350 | 0.450 | 0.200 | 0.50 | Sr | 1.000 |
| 79 | Mg | Nb | 0.350 | 0.450 | 0.200 | 1.00 | Sr | 1.000 |
| 80 | Mg | Nb | 0.350 | 0.450 | 0.200 | 1.90 | Sr | 1.000 |
| 81 | Co | Nb | 0.350 | 0.450 | 0.200 | 1.90 | Sr | 1.000 |
| 82 | Mg | Nb | 0.350 | 0.450 | 0.200 | 2.00 | Sr | 1.000 |
| 83 | $Mg_{1/4}Co_{1/4}Zn_{1/4}Ni_{1/4}$ | Nb | 0.340 | 0.520 | 0.140 | 0 | Sr | 0.100 |
| 84 | $Mg_{1/2}Co_{1/2}$ | Nb | 0.340 | 0.520 | 0.140 | 1.00 | Sr | 0.100 |

TABLE 4-continued

| Sample No. | Composition of main component A | B | (molar fraction) x | y | z | (value) u | Accessory component | (wt. %) |
|---|---|---|---|---|---|---|---|---|
| 85 | $Mg_{1/3}Co_{1/3}Ni_{1/3}$ | Ta | 0.340 | 0.520 | 0.140 | 1.00 | Sr | 0.100 |
| 86 | $Mg_{1/4}Co_{1/4}Zn_{1/4}Ni_{1/4}$ | $Nb_{1/2}Ta_{1/2}$ | 0.340 | 0.520 | 0.140 | 1.00 | Sr | 0.100 |
| 87 | $Mg_{39/40}Mn_{1/40}$ | $Nb_{1/2}Ta_{1/2}$ | 0.340 | 0.520 | 0.140 | 0.02 | Bi | 0.100 |
| 88 | $Mg_{113/200}Mn_{87/200}$ | Nb | 0.328 | 0.502 | 0.170 | 0.41 | Bi | 0.100 |
| 89 | Mn | Nb | 0.200 | 0.600 | 0.200 | 0 | Ca | 0.100 |
| 90 | Mg | Nb | 0.300 | 0.400 | 0.300 | 1.00 | Sr | 0.500 |
| 91 | Mg | Nb | 0.300 | 0.400 | 0.300 | 1.00 | Ba | 0.500 |
| 92 | Mg | Nb | 0.300 | 0.400 | 0.300 | 1.00 | Ca | 0.500 |
| 93 | Mg | Nb | 0.300 | 0.400 | 0.300 | 1.00 | Bi | 0.500 |
| 94 | Mg | Nb | 0.300 | 0.400 | 0.300 | 1.00 | Ba | 0.500 |
|  |  |  |  |  |  |  | Sr | 0.500 |
|  |  |  |  |  |  |  | Ca | 0.500 |
|  |  |  |  |  |  |  | Bi | 0.500 |
| 95 | Mg | Nb | 0.300 | 0.400 | 0.300 | 1.00 | Sr | 1.500 |
| 96 | Mg | Nb | 0.300 | 0.400 | 0.300 | 1.00 | Sr | 3.000 |
| 97 | Mg | Nb | 0.300 | 0.400 | 0.300 | 1.00 | Sr | 7.000 |
| *98 | Mg | Nb | 0.300 | 0.400 | 0.300 | 1.00 | Sr | 8.000 |

TABLE 5

| Sample No. | $\epsilon_r$ | $\tau_f$ | Qu |
|---|---|---|---|
| *27 | 30.1 | −84.9 | 950 |
| *28 | 29.9 | −70.5 | 850 |
| *29 | 30.0 | −88.7 | 970 |
| *30 | 30.8 | −69.4 | 830 |
| 31 | 32.5 | −10.8 | 8000 |
| 32 | 31.3 | −8.9 | 9000 |
| 33 | 30.9 | −7.8 | 8100 |
| 34 | 32.3 | −32.1 | 4300 |
| 35 | 33.1 | −19.5 | 4800 |
| 36 | 57.5 | 47.4 | 5300 |
| 37 | 55.5 | 40.2 | 6100 |
| *38 | 75.8 | 225.2 | 370 |
| *39 | 28.0 | −84.8 | 980 |
| 40 | 33.8 | −8.5 | 9600 |
| 41 | 26.8 | −5.4 | 9600 |
| *42 | 45.8 | 250.8 | 1800 |
| 43 | 44.5 | 42.3 | 3900 |
| 44 | 44.3 | 42.0 | 3600 |
| 45 | 43.8 | 45.9 | 3100 |
| 46 | 44.5 | 46.8 | 3100 |
| 47 | 39.3 | 15.3 | 6000 |
| 48 | 42.0 | 0.3 | 9700 |
| 49 | 43.1 | 12.1 | 8500 |
| 50 | 42.2 | −5.3 | 8300 |
| 51 | 43.1 | 9.3 | 7900 |
| 52 | 45.1 | 13.4 | 5100 |
| 53 | 44.1 | 1.3 | 7900 |
| 54 | 42.9 | 16.2 | 5100 |
| 55 | 41.5 | 10.3 | 5500 |
| *56 | 35.7 | 60.5 | 870 |
| *57 | 29.5 | 21.3 | 620 |
| 58 | 40.2 | 45.9 | 4000 |
| 59 | 65.5 | 48.9 | 3300 |
| 60 | 55.8 | 48.1 | 4100 |
| *61 | 82.9 | 151.8 | 830 |
| *62 | 86.8 | 213.3 | 420 |
| 63 | 42.8 | 14.3 | 4800 |
| 64 | 45.6 | 20.0 | 4700 |
| 65 | 43.7 | 28.7 | 4000 |
| 66 | 45.7 | 19.5 | 4900 |
| 67 | 42.9 | 16.3 | 4600 |
| 68 | 40.2 | 7.3 | 4200 |
| 69 | 37.1 | 4.2 | 4000 |
| 70 | 45.8 | 19.7 | 4700 |
| 71 | 44.5 | 14.1 | 4900 |
| 72 | 47.0 | 35.4 | 4700 |
| 73 | 43.7 | 19.8 | 5100 |
| 74 | 44.2 | 40.2 | 4700 |
| 75 | 42.7 | 14.0 | 5100 |
| 76 | 43.8 | 10.5 | 6700 |
| 77 | 45.2 | 30.4 | 7100 |
| 78 | 42.9 | 9.3 | 7200 |
| 79 | 41.5 | 8.5 | 7500 |
| 80 | 35.2 | 0.1 | 6000 |
| 81 | 32.3 | −9.8 | 5200 |
| 82 | 34.2 | −5.3 | 4300 |
| 83 | 45.1 | 17.3 | 5700 |
| 84 | 43.8 | 6.7 | 7500 |
| 85 | 40.1 | 9.8 | 8500 |
| 86 | 41.8 | 4.9 | 7300 |
| 87 | 43.4 | 9.8 | 7200 |
| 88 | 42.9 | 8.7 | 6800 |
| 89 | 61.2 | 48.5 | 3500 |
| 90 | 41.2 | −25.8 | 8500 |
| 91 | 40.3 | −35.7 | 9200 |
| 92 | 40.7 | −36.4 | 6300 |
| 93 | 44.3 | −24.1 | 5800 |
| 94 | 42.5 | −34.2 | 4900 |
| 95 | 42.8 | −17.5 | 8100 |
| 96 | 44.5 | −3.2 | 7000 |
| 97 | 52.1 | 38.5 | 3800 |
| *98 | 59.3 | 58.3 | 910 |

As is apparent from the results shown in Table 5, in dielectric ceramic compositions within a composition range of the invention, the dielectric constant is kept at a high value at microwave frequencies, while a high unloaded Q value is provided.

On the contrary, when X is higher than 0.60, the unloaded Q value is significantly reduced as observed in sample Nos. 56 and 57. The objects of the invention cannot readily be achieved. When x is lower than 0.10, the unloaded Q value is reduced as observed in Example Nos. 61 and 62.

When y is higher than 0.60, the unloaded Q value is significantly reduced as observed in sample No. 38. Further, when y is lower than 0.20, the unloaded Q value is significantly reduced as observed in sample Nos. 27 to 30 and No. 39. Consequently, the objects of the invention cannot readily be achieved.

When z is higher than 0.70, the unloaded Q value is reduced as observed in sample No. 39. Further, when z is lower than 0.01, the unloaded Q value is reduced as observed in sample No. 42. Consequently, the objects of the invention cannot readily be achieved.

Additionally, the unloaded Q value can be improved by increasing u to a higher value than 0. However, when u exceeds 1.90, the unloaded Q value is reduced as observed in sample No. 82. Also in the case of sample No. 82, the properties were better than those of conventional dielectric ceramics.

When the amount of accessory component to be added is higher than 7.000% by weight, the unloaded Q value is significantly reduced as observed in sample No. 98. Consequently, the objects of the invention cannot readily be achieved.

It was confirmed within the composition range of the example that the unloaded Q value was improved by using A, which is at least one element selected from Mg, Co, Zn, Ni, and Mn and B, which is at least one element selected from Nb and Ta, oxides were calcined in advance at a temperature of 800° to 1200° C.

Additionally, a ZrTiO$_4$ phase or one recognized as being a crystallographical ZrTiO$_4$ phase was confirmed by powder X-ray diffraction of a dielectric ceramic within the composition range of Examples 1 and 2 of the invention. It was further confirmed in composition analysis by a local X-ray diffractometer of a fracture surface and polished surface of the dielectric ceramic having, as the main component, ZrTiO$_4$ phase or crystallographical ZrTiO$_4$ phase that all components of Zr, Ti, A and B (wherein A is at least one component selected from Mg, Co, Zn, Ni and Mn, and B is at least one component selected from Nb and Ta) were present in a single grain, and their composition ratio was consistent with the composition ratio between other grains that constitute the main phase in the same dielectric ceramic. It was also confirmed that all components A and B blended were present in a single grain. Moreover, it was confirmed that a dielectric ceramic with components Zr, Ti, A and B present in a grain which constitutes the main phase showed a higher lattice constant in comparison with ZrTiO$_4$ ceramic obtained under the same sintering conditions. Accordingly, it was confirmed that components A and B are substituted in the ZrTiO$_4$ phase or the crystallographical ZrTiO$_4$ phase.

Such dielectric ceramics specifically showed a high unloaded Q value and a high dielectric constant, and were superior in thermo-stability at a resonant frequency. The unloaded Q value was even higher when the molar ratio a/b of the component A to the component B was 0.5 or more and 1.9 or less.

As is apparent from the results described above, it was confirmed that the dielectric ceramics of the example are capable of maintaining the dielectric constant at a high value at microwave frequencies, while providing a high unloaded Q value, and are superior in thermo-stability at a resonant frequency.

EXAMPLE 3

As initial materials, ZrO$_2$, TiO$_2$, MgO, CoO, ZnO, NiO, MnCO$_3$, Nb$_2$O$_5$, Ta$_2$O$_5$, SnO$_2$, HfO$_2$, GeO$_2$, BaCO$_3$, SrCO$_3$, CaCO$_3$, CuO, Bi$_2$O$_3$, and WO$_3$ of high chemical purity which are the same as in Example 1 were used, weighed so as to make predetermined compositions and wet-blended with ethanol by using a ball mill. The volume ratio between the powder and ethanol was approximately 2:3.

The mixture was removed from the ball mill, dried, and calcined for 2 to 8 hrs at 800° C. to 1250° C. in the air. The calcined product was wet-milled in the ball mill with ethanol. After the milled slurry was removed from the ball mill and dried, the powder was mixed with 8% by weight of polyvinyl alcohol solution of 6 vol. % in concentration added thereto as a binder, homogenized, and granulated by sieving through a 32 mesh screen. The granulated powder was molded into a disk of 7 mm in diameter and approximately 3 mm in thickness by using molds and an oil hydraulic press at a molding pressure of 1.3 ton/cm$^2$.

The molding was placed in a magnesia vessel of high purity, kept in the air at a temperature of 400° C. to 700° C. for 4 to 8 hrs to remove binders, retained in the air at 1200° C. to 1650° C. for 1 to 100 hrs for sintering, and dielectric ceramics were obtained.

The resonant frequency, unloaded Q (Qu) value and dielectric constant $\epsilon_r$ were obtained from measurement by the dielectric rod resonator method. The temperature coefficient at a resonant frequency $\tau_f$ was obtained in a range between −25° C. and 85° C. The resonant frequency was obtained in a range between 4 GHz and 12 GHz.

The compositions of main components and the amount of accessory components, which are to be added, of the dielectric ceramics thus produced are shown in Table 6. The dielectric constant thus obtained, the temperature at a resonant frequency $\tau_f$ (ppm/° C.) and the unloaded Q value are shown in Table 7. In Tables 6 and 7, comparative examples have an asterisk.

TABLE 6

| Sample No. | A | B | D | Composition of main component (molar fraction) | | | (value) | | Accessory component (wt. %) |
|---|---|---|---|---|---|---|---|---|---|
| | | | | x | y | z | v | u | |
| *99 | Mg | Nb | Sn | 0.400 | 0.150 | 0.400 | 0.050 | 0 | Sr 0.005 |
| 100 | Mg | Nb | Sn | 0.200 | 0.200 | 0.400 | 0.200 | 0 | Sr 1.000 |
| 101 | Co | Nb | Sn | 0.200 | 0.200 | 0.400 | 0.200 | 0 | Sr 1.000 |
| 102 | Ni | Nb | Sn | 0.200 | 0.200 | 0.400 | 0.200 | 0 | Sr 1.000 |
| 103 | Mg | Nb | Sn | 0.450 | 0.200 | 0.300 | 0.050 | 0 | Sr 0.500 |
| 104 | Co | Nb | Sn | 0.450 | 0.200 | 0.300 | 0.050 | 0 | Sr 0.500 |
| 105 | Mg | Nb | Sn | 0.200 | 0.600 | 0.100 | 0.100 | 0 | Ba 0.500 |
| 106 | Zn | Nb | Sn | 0.200 | 0.600 | 0.150 | 0.050 | 0 | Ba 0.500 |
| *107 | Mg | Nb | Sn | 0.150 | 0.700 | 0.100 | 0.050 | 0 | Sr 1.000 |
| *108 | Mg | Nb | Sn | 0.150 | 0.120 | 0.530 | 0.200 | 0 | Ba 0.500 |
| 109 | Mg | Nb | Sn | 0.100 | 0.200 | 0.500 | 0.200 | 0 | Ba 0.500 |
| *110 | Mg | Nb | Sn | 0.100 | 0.200 | 0.300 | 0.400 | 0 | Ba 0.500 |
| *111 | — | — | — | 0.550 | 0.450 | 0 | 0 | 0 | — 0 |
| 112 | Mg | Nb | Sn | 0.490 | 0.450 | 0.010 | 0.050 | 0 | Ba 0.005 |
| 113 | Mg | Nb | Sn | 0.300 | 0.300 | 0.300 | 0.100 | 0 | Sr 1.000 |
| 114 | Mg | Nb | Sn | 0.400 | 0.400 | 0.199 | 0.001 | 0 | Sr 0.005 |
| 115 | Co | Nb | Sn | 0.400 | 0.400 | 0.199 | 0.001 | 0 | Sr 0.005 |
| 116 | Zn | Nb | Sn | 0.400 | 0.400 | 0.199 | 0.001 | 0 | Sr 0.005 |
| 117 | Mg | Nb | Sn | 0.450 | 0.450 | 0.050 | 0.050 | 0 | Sr 0.100 |
| *118 | Mg | Nb | Sn | 0.650 | 0.200 | 0.050 | 0.050 | 0 | Ca 0.100 |
| 119 | Mg | Nb | Sn | 0.600 | 0.300 | 0.050 | 0.050 | 0 | Ca 0.100 |
| *120 | Mg | Nb | Sn | 0.050 | 0.500 | 0.400 | 0.050 | 0 | Ca 0.100 |
| 121 | Mg | Nb | Sn | 0.450 | 0.350 | 0.150 | 0.050 | 0 | Sr 1.000 |

TABLE 6-continued

| Sample No. | Composition of main component | | | | | | | Accessory component (wt. %) |
|---|---|---|---|---|---|---|---|---|
| | A | B | D | (molar fraction) | | | (value) | |
| | | | | x | y | z | v | u | |
| 122 | Mg | Nb | Sn | 0.350 | 0.450 | 0.150 | 0.050 | 0 | Sr 1.000 Cu 0.005 |
| 123 | Mg | Nb | Sn | 0.350 | 0.450 | 0.150 | 0.050 | 0 | Sr 1.000 Cu 0.100 |
| 124 | Mg | Nb | Sn | 0.350 | 0.450 | 0.150 | 0.050 | 0 | Sr 1.000 W 0.005 |
| 125 | Mg | Nb | Sn | 0.350 | 0.450 | 0.150 | 0.050 | 0 | Sr 1.000 W 0.100 |
| 126 | Mg | Nb | Sn | 0.350 | 0.450 | 0.150 | 0.050 | 0 | Sr 1.000 W 1.000 |
| 127 | Mg | Nb | Sn | 0.350 | 0.450 | 0.150 | 0.050 | 0 | Sr 1.000 W 2.000 |
| 128 | Mg | Nb | Sn | 0.350 | 0.450 | 0.150 | 0.050 | 0 | Sr 1.000 |
| 129 | Mg | Nb | Sn | 0.350 | 0.450 | 0.150 | 0.050 | 0.01 | Sr 1.000 |
| 130 | Mg | Nb | Sn | 0.350 | 0.450 | 0.150 | 0.050 | 0.05 | Sr 1.000 |
| 131 | Mg | Nb | Sn | 0.350 | 0.450 | 0.150 | 0.050 | 0.20 | Sr 1.000 |
| 132 | Mg | Nb | Sn | 0.350 | 0.450 | 0.150 | 0.050 | 0.50 | Sr 1.000 |
| 133 | Mg | Nb | Sn | 0.350 | 0.450 | 0.150 | 0.050 | 1.00 | Sr 1.000 |
| 134 | Mg | Nb | Sn | 0.350 | 0.450 | 0.150 | 0.050 | 1.90 | Sr 1.000 |
| 135 | Co | Nb | Sn | 0.350 | 0.450 | 0.150 | 0.050 | 1.90 | Sr 1.000 |
| 136 | Mg | Nb | Sn | 0.350 | 0.450 | 0.150 | 0.050 | 2.00 | Sr 1.000 |
| 137 | $Mg_{1/4}Co_{1/4}Zn_{1/4}Ni_{1/4}$ | Nb | Sn | 0.340 | 0.520 | 0.130 | 0.010 | 0 | Sr 0.100 |
| 138 | $Mg_{1/3}Co_{1/3}Ni_{1/3}$ | Ta | Sn | 0.340 | 0.520 | 0.130 | 0.010 | 1.00 | Sr 0.100 |
| 139 | $Mg_{1/4}Co_{1/4}Zn_{1/4}Ni_{1/4}$ | $Nb_{1/2}Ta_{1/2}$ | Sn | 0.340 | 0.520 | 0.130 | 0.010 | 1.00 | Sr 0.100 |
| 140 | Mn | Nb | Sn | 0.200 | 0.600 | 0.190 | 0.010 | 0 | Ca 0.100 |
| 141 | Mg | Nb | Sn | 0.300 | 0.400 | 0.200 | 0.100 | 1.00 | Sr 0.500 |
| 142 | Mg | Nb | Sn | 0.300 | 0.400 | 0.200 | 0.100 | 1.00 | Ba 0.500 |
| 143 | Mg | Nb | Sn | 0.300 | 0.400 | 0.200 | 0.100 | 1.00 | Ca 0.500 |
| 144 | Mg | Nb | Sn | 0.300 | 0.400 | 0.200 | 0.100 | 1.00 | Bi 0.500 |
| 145 | Mg | Nb | Sn | 0.300 | 0.400 | 0.200 | 0.100 | 1.00 | Ba 0.500 Sr 0.500 Ca 0.500 Bi 0.500 |
| 146 | Mg | Nb | Sn | 0.300 | 0.400 | 0.200 | 0.100 | 1.00 | Sr 1.500 |
| 147 | Mg | Nb | Sn | 0.300 | 0.400 | 0.200 | 0.100 | 1.00 | Sr 3.000 |
| 148 | Mg | Nb | Sn | 0.300 | 0.400 | 0.200 | 0.100 | 1.00 | Sr 7.000 |
| *149 | Mg | Nb | Sn | 0.300 | 0.400 | 0.200 | 0.100 | 1.00 | Sr 8.000 |
| 150 | Mg | Nb | Hf | 0.350 | 0.450 | 0.150 | 0.050 | 1.90 | Sr 1.000 |
| 151 | Mg | Nb | Ge | 0.350 | 0.450 | 0.150 | 0.050 | 1.90 | Sr 1.000 |

TABLE 7

| Sample No. | $\epsilon_r$ | $\tau_f$ | Qu |
|---|---|---|---|
| *99 | 29.8 | −85.3 | 1200 |
| 100 | 27.6 | −20.4 | 9600 |
| 101 | 26.7 | −17.5 | 7500 |
| 102 | 28.3 | −15.4 | 6900 |
| 103 | 31.7 | −34.0 | 4000 |
| 104 | 32.9 | −22.5 | 4100 |
| 105 | 55.4 | 28.3 | 5500 |
| 106 | 53.1 | 15.3 | 5800 |
| *107 | 74.3 | 225.0 | 480 |
| *108 | 21.3 | −91.2 | 1200 |
| 109 | 30.2 | −14.5 | 8600 |
| *110 | 24.3 | −60.5 | 400 |
| *111 | 45.8 | 250.8 | 1800 |
| 112 | 42.5 | 23.2 | 4800 |
| 113 | 37.2 | 7.8 | 6500 |
| 114 | 41.5 | −0.2 | 8300 |
| 115 | 43.0 | 11.5 | 7800 |
| 116 | 42.0 | −5.8 | 6800 |
| 117 | 40.1 | 4.2 | 5100 |
| *118 | 33.0 | 60.0 | 320 |
| 119 | 40.1 | 42.3 | 3100 |
| *120 | 82.3 | 147.2 | 200 |
| 121 | 42.1 | 10.3 | 4100 |
| 122 | 43.1 | 15.5 | 4000 |
| 123 | 41.0 | 25.7 | 3800 |
| 124 | 43.1 | 15.1 | 4200 |
| 125 | 40.9 | 11.9 | 4000 |
| 126 | 38.0 | 3.1 | 3700 |
| 127 | 35.4 | −1.0 | 3500 |
| 128 | 43.2 | 15.3 | 4000 |
| 129 | 42.9 | 14.9 | 4500 |
| 130 | 41.2 | 3.2 | 5000 |
| 131 | 40.5 | 0.2 | 6100 |
| 132 | 37.2 | −4.5 | 6300 |

TABLE 7-continued

| Sample No. | $\epsilon_r$ | $\tau_f$ | Qu |
|---|---|---|---|
| 133 | 34.3 | −15.5 | 7000 |
| 134 | 30.1 | −32.5 | 7100 |
| 135 | 30.9 | −35.4 | 5800 |
| 136 | 28.9 | −37.4 | 3900 |
| 137 | 44.7 | 15.3 | 5100 |
| 138 | 39.7 | 9.3 | 8100 |
| 139 | 40.9 | 4.5 | 6500 |
| 140 | 60.3 | 44.9 | 3800 |
| 141 | 37.9 | −30.3 | 7800 |
| 142 | 36.1 | −35.4 | 8100 |
| 143 | 36.9 | −35.1 | 5400 |
| 144 | 42.3 | −25.9 | 3800 |
| 145 | 40.1 | −33.2 | 3500 |
| 146 | 39.3 | −20.1 | 6900 |
| 147 | 44.5 | 1.2 | 5800 |
| 148 | 50.2 | 39.5 | 4100 |
| *149 | 61.5 | 65.4 | 320 |
| 150 | 45.3 | −28.5 | 5300 |
| 151 | 30.9 | −34.5 | 4900 |

As is apparent from the results shown in Table 7, it was confirmed that, in dielectric ceramic compositions within a composition range of the present invention, the dielectric constant is kept at a high value at microwave frequencies, while a high unloaded Q value is provided.

On the contrary, when X is higher than 0.60, the unloaded Q value is significantly reduced as observed in sample No. 118. Consequently, the objects of the invention cannot readily be achieved. When x is lower than 0.10, the unloaded Q value is reduced as observed in sample No. 120. Consequently, the objects of the invention cannot readily be achieved.

When y is higher than 0.60, the unloaded Q value is significantly reduced as observed in sample No. 107. Further, when y is lower than 0.20, the unloaded Q value is significantly reduced as observed in sample Nos. 99 and 108. Consequently, the objects of the invention cannot readily be achieved.

When z is higher than 0.50, the unloaded Q value is reduced as observed in sample No. 108. When z is lower than 0.01, the unloaded Q value is reduced as observed in sample No. 111. Consequently, the objects of the invention cannot readily be achieved.

Additionally, the unloaded Q value can be improved by increasing w to a higher value than 0. However, when w exceeds 1.90, the unloaded Q value is reduced as shown in sample No. 136. Also in the case of sample No. 136, the properties were better than those of conventional dielectric ceramics.

When the amount of accessory component to be added is higher than 7.000% by weight, the unloaded Q value is significantly reduced as observed in sample No. 149. Consequently, the objects of the invention cannot readily be achieved.

It was confirmed within the composition range of the example that the unloaded Q value was improved by using A, which is at least one element selected from Mg, Co, Zn, Ni, and Mn and B, which is at least one element selected from Nb and Ta, oxides that were calcined in advance at a temperature of 800° C. to 1200° C.

Additionally, a $ZrTiO_4$ phase or one recognized as being a crystallographical $ZrTiO_4$ phase was confirmed by powder X-ray diffraction of a dielectric ceramic within the composition range of Examples 1 and 3 of the invention. It was further confirmed in composition analysis by a local X-ray diffractometer of a fracture surface and polished surface of the dielectric ceramic having as the main component $ZrTiO_4$ phase or crystallographical $ZrTiO_4$ phase, that all components of Zr, Ti, A, B and D (wherein A is at least one component selected from Mg, Co, Zn, Ni and Mn, B is at least one component selected from Nb and Ta, and D is at least one component selected from Sn, Hf and Ge) were present in a single grain, and their composition ratio was consistent with the composition ratio between other grains that constitute the main phase in the same dielectric ceramic. It was also confirmed that all components A, B and D blended were present in a single grain.

Moreover, it was confirmed that a dielectric ceramic with components Zr, Ti, A, B and D present in a grain which constitutes the main phase showed a higher lattice constant in comparison with $ZrTiO_4$ ceramic obtained under the same sintering conditions. Accordingly, it was confirmed that components A, B and D are substituted in the $ZrTiO_4$ phase or the crystallographical $ZrTiO_4$ phase.

Such dielectric ceramics specifically showed a high unloaded Q value and a high dielectric constant, and were superior in thermo-stability at a resonant frequency. The unloaded Q value was even higher when the molar ratio a/b of the component A to the component B was 0.5 or more and 1.9 or less As is obvious from the results described above, it was confirmed that the dielectric ceramics of the example are capable of maintaining the dielectric constant at a high value at microwave frequencies, while providing a high unloaded Q value, and are superior in thermo-stability at a resonant frequency.

EXAMPLE 4

As initial materials, $ZrO_2$, $TiO_2$, MgO, CoO, ZnO, NiO, $MnCO_3$, $Nb_2O_5$, $Ta_2O_5$, $BaCO_3$, $SrCO_3$, $CaCO_3$, CuO, $Bi_2O_3$, and $WO_3$ of high chemical purity were used, weighed so as to make predetermined compositions and wet-blended with ethanol by using a ball mill. The volume ratio between the powder and ethanol was approximately 2:3.

The mixture was removed from the ball mill, dried, and calcined for 2 to 8 hrs at 800° C. to 1250° C. in the air. The calcined product was wet-milled in the ball mill with ethanol. After the milled slurry was removed from the ball mill and dried, the powder was mixed with 8% by weight of polyvinyl alcohol solution of 6 vol. % in concentration added thereto as a binder, homogenized, and granulated by sieving through 32 mesh screen. The granulated powder was molded into a cylindrical coaxial shape by using molds and an oil hydraulic press at a molding pressure of 1.3 ton/cm².

The molding was placed in a magnesia vessel of high purity, kept in the air at a temperature of 400° C. to 700° C. for 4 to 8 hrs to remove binders, retained in the air at 1200° C. to 1650° C. for 1 to 100 hrs for sintering, and cylindrical coaxial dielectric ceramics having an outer diameter of 7.2 mm and an inner diameter of 3.6 mm were obtained.

When copper was used for an electrode material, a copper coat having a thickness of about 3.5 μm was formed on the dielectric ceramic surface by the electroless plating method. When silver was used for the electrode material, silver paste which is on the market was burned to form a silver coat. In both cases, one of two end faces of the coaxial type device ground the electrode material, so that a TEM mode resonator was obtained.

The compositions of main components and the amount of accessory components, which are to be added, of the dielectric resonator thus produced are shown in Table 8, the electrode material which was used, the unloaded Q value and the bond strength are shown in Table 9. The resonant frequency was 1.3 to 1.7 GHz. In Tables 8 and 9, comparative examples have an asterisk.

TABLE 8

| Sample No. | Composition of main component | | | | | Accessory component |
|---|---|---|---|---|---|---|
| | A | B | x (molar fraction) y z | | | (value) u | (wt. %) |
| *152 | Mg | Nb | 0.340 | 0.520 | 0.140 | 0 | — 0 |
| *153 | — | — | 0.550 | 0.450 | 0 | 0 | — 0 |
| 154 | Mg | Nb | 0.340 | 0.520 | 0.140 | 0 | Sr 0.100 |
| 155 | Co | Nb | 0.340 | 0.520 | 0.140 | 0 | Sr 0.100 |
| 156 | Zn | Nb | 0.340 | 0.520 | 0.140 | 0 | Sr 0.100 |
| 157 | Ni | Nb | 0.340 | 0.520 | 0.140 | 0 | Sr 0.100 |
| 158 | Mg | Nb | 0.100 | 0.400 | 0.500 | 0 | Bi 0.100 |
| 159 | Ni | Nb | 0.100 | 0.400 | 0.500 | 0 | Bi 0.100 |
| 160 | Mg | Nb | 0.450 | 0.350 | 0.200 | 0 | Sr 1.000 |
| 161 | Mg | Nb | 0.350 | 0.450 | 0.200 | 0 | Sr 1.000 Cu 0.005 |
| 162 | Mg | Nb | 0.350 | 0.450 | 0.200 | 0 | Sr 1.000 Cu 0.100 |
| 163 | Mg | Nb | 0.350 | 0.450 | 0.200 | 0 | Sr 1.000 W 0.005 |
| 164 | Mg | Nb | 0.350 | 0.450 | 0.200 | 0 | Sr 1.000 W 0.100 |
| 165 | Mg | Nb | 0.350 | 0.450 | 0.200 | 0 | Sr 1.000 W 1.000 |
| 166 | Mg | Nb | 0.350 | 0.450 | 0.200 | 0 | Sr 1.000 W 2.000 |
| 167 | Mg | Nb | 0.350 | 0.450 | 0.200 | 0 | Sr 1.000 |
| 168 | Mg | Nb | 0.350 | 0.450 | 0.200 | 0.05 | Sr 1.000 |
| 169 | Mg | Nb | 0.350 | 0.450 | 0.200 | 0.20 | Sr 1.000 |
| 170 | Co | Nb | 0.350 | 0.450 | 0.200 | 0.20 | Sr 1.000 |
| 171 | Mg | Nb | 0.350 | 0.450 | 0.200 | 0.50 | Sr 1.000 |
| 172 | Mg | Nb | 0.350 | 0.450 | 0.200 | 1.00 | Sr 1.000 |
| 173 | Mg | Nb | 0.350 | 0.450 | 0.200 | 1.90 | Sr 1.000 |
| 174 | Co | Nb | 0.350 | 0.450 | 0.200 | 1.90 | Sr 1.000 |
| 175 | $Mg_{1/3}Co_{1/3}Ni_{1/3}$ | Ta | 0.340 | 0.520 | 0.140 | 1.00 | Sr 0.100 |
| 176 | $Mg_{1/4}Co_{1/4}Zn_{1/4}Ni_{1/4}$ | $Nb_{1/2}Ta_{1/2}$ | 0.340 | 0.520 | 0.140 | 1.00 | Sr 0.100 |
| 177 | $Mg_{39/40}Mn_{1/40}$ | $Nb_{1/2}Ta_{1/2}$ | 0.340 | 0.520 | 0.140 | 0.02 | Bi 0.100 |
| 178 | $Mg_{113/200}Mn_{7/200}$ | Nb | 0.328 | 0.502 | 0.170 | 0.41 | Bi 0.100 |
| 179 | Mg | Nb | 0.300 | 0.400 | 0.300 | 1.00 | Ba 0.500 |
| 180 | Mg | Nb | 0.300 | 0.400 | 0.300 | 1.00 | Ca 0.500 |
| 181 | Mg | Nb | 0.300 | 0.400 | 0.300 | 1.00 | Bi 0.500 |
| 182 | Mg | Nb | 0.300 | 0.400 | 0.300 | 1.00 | Ba 0.500 Sr 0.500 Ca 0.500 Bi 0.500 |
| 183 | Mg | Nb | 0.300 | 0.400 | 0.300 | 1.00 | Sr 1.500 |
| 184 | Mg | Nb | 0.300 | 0.400 | 0.300 | 1.00 | Sr 1.500 |
| 185 | Mg | Nb | 0.300 | 0.400 | 0.300 | 1.00 | Sr 3.000 |
| 186 | Mg | Nb | 0.300 | 0.400 | 0.300 | 1.00 | Sr 7.000 |
| *187 | Mg | Nb | 0.300 | 0.400 | 0.300 | 1.00 | Sr 8.000 |

TABLE 9

| Sample No. | Electrode material | Qu | Bond strength (kg/4 mm²) |
|---|---|---|---|
| *152 | Cu | 150 | 0.4 |
| *153 | Cu | Unmeasurable due to electrode peeling | |
| 154 | Cu | 550 | 6.8 |
| 155 | Cu | 520 | 6.4 |
| 156 | Cu | 500 | 6.3 |
| 157 | Cu | 510 | 6.0 |
| 158 | Cu | 530 | 6.1 |
| 159 | Cu | 500 | 6.3 |
| 160 | Cu | 630 | 9.7 |
| 161 | Cu | 670 | 12.0 |
| 162 | Cu | 650 | 12.0 |
| 163 | Cu | 660 | 11.5 |
| 164 | Cu | 650 | 10.9 |
| 165 | Cu | 620 | 10.7 |
| 166 | Cu | 600 | 11.0 |
| 167 | Cu | 650 | 9.3 |
| 168 | Cu | 670 | 9.1 |
| 169 | Cu | 690 | 9.5 |
| 170 | Cu | 670 | 9.1 |
| 171 | Cu | 710 | 8.8 |
| 172 | Cu | 740 | 9.6 |
| 173 | Cu | 750 | 9.0 |
| 174 | Cu | 740 | 8.9 |
| 175 | Cu | 580 | 7.3 |
| 176 | Cu | 620 | 9.1 |
| 177 | Cu | 640 | 7.8 |
| 178 | Cu | 630 | 7.5 |
| 179 | Cu | 640 | 9.7 |
| 180 | Cu | 530 | 6.1 |
| 181 | Cu | 610 | 9.3 |
| 182 | Cu | 670 | 11.5 |
| 183 | Cu | 750 | 10.4 |
| 184 | Ag | 730 | 12.0 |
| 185 | Cu | 740 | 11.5 |
| 186 | Cu | 680 | 12.0 |
| *187 | Cu | 210 | 10.5 |

As is apparent from the results shown in Table 9, the dielectric resonators of the embodiment had a high bond strength also when an electroless copper electrode is used in the same way as a silver electrode. For this reason, the unloaded Q value is high in a microwave frequency band and the resonant frequency can be prevented from deviating due to electrode peeling so that electric characteristics are stable. In addition, the dielectric resonators of the invention are suitable for forming electrodes by copper plating, so that they are suitable for large scale production and manufacturing costs can be reduced.

Additionally, a $ZrTiO_4$ phase or one recognized as being a crystallographical $ZrTiO_4$ phase was confirmed by powder X-ray diffraction of a dielectric ceramic within the composition range of Example 4 of the invention. It was further confirmed in composition analysis by a local X-ray diffractometer of a fracture surface and polished surface of the dielectric ceramic having as the main component $ZrTiO_4$ phase or crystallographical $ZrTiO_4$ phase, that all components of Zr, Ti, A and B (wherein A is at least one component selected from Mg, Co, Zn, Ni and Mn, and B is at least one component selected from Nb and Ta) were present in a single grain, and their composition ratio was consistent with the composition ratio between other grains that constitute the main phase in the same dielectric ceramic. It was also confirmed that all components A and B blended were present in a single grain. Moreover, it was confirmed that a dielectric ceramic with components Zr, Ti, A and B present in a grain which constitutes the main phase showed a higher lattice constant in comparison with $ZrTiO_4$ ceramic obtained under the same sintering conditions. Accordingly, it was confirmed that components A and B are substituted in the $ZrTiO_4$ phase or the crystallographical $ZrTiO_4$ phase.

Such dielectric ceramics specifically showed a high unloaded Q value and a high dielectric constant, and were superior in thermo-stability at a resonant frequency. The unloaded Q value was even higher when the molar ratio a/b of the component A to the component B was 0.5 or more and 1.9 or less. The dielectric resonators having such dielectric ceramics had an unloaded Q value which is specially high, and a high electrode bond strength.

As is obvious from the results described above, it was confirmed that the dielectric resonators of the example have the unloaded Q value which is specially high at a microwave frequency band. Moreover, the resonant frequency can be prevented from deviating due to electrode peeling. In addition, the dielectric resonators of the invention are suitable for forming electrodes by copper plating, so that they can be produced on a large scale and manufacturing costs can be reduced.

EXAMPLE 5

As initial materials, $ZrO_2$, $TiO_2$, MgO, CoO, ZnO, NiO, $MnCO_3$, $Nb_2O_5$, $Ta_2O_5$, $SnO_2$, $HfO_2$, $GeO_2$, $BaCO_3$, $SrCO_3$, $CaCO_3$, CuO, $Bi_2O_3$, and $WO_3$ of high chemical purity which are the same as in Example 1 were used, weighed so as to make predetermined compositions and wet-blended with ethanol by using a ball mill. The volume ratio between the powder and ethanol was approximately 2:3.

The mixture was removed from the ball mill, dried, and calcined for 2 to 8 hrs at 800° C. to 1250° C. in the air. The calcined product was wet-milled in the ball mill with ethanol. After the milled slurry was removed from the ball mill and dried, the powder was mixed with 8% by weight of polyvinyl alcohol solution of 6 vol. % in concentration added thereto as a binder, homogenized, and granulated by sieving through 32 mesh screen. The granulated powder was molded into a cylindrical coaxial shape by using molds and an oil hydraulic press at a molding pressure of 1.3 ton/$cm^2$.

The molding was placed in a magnesia vessel of high purity, kept in the air at a temperature of 400° C. to 700° C. for 4 to 8 hrs to remove binders, retained in the air at 1200° C. to 1650° C. for 1 to 100 hrs for sintering, and cylindrical coaxial dielectric ceramics having an outer diameter of 7.2 mm and an inner diameter of 3.6 mm were obtained.

When copper was used for an electrode material, a copper coat having a thickness of about 3.5 μm was formed on the dielectric ceramic surface by the electroless plating method. When silver was used for the electrode material, silver paste which is on the market was burned to form a silver coat. In both cases, one of two end faces of the coaxial type device ground the electrode material, so that a TEM mode resonator was obtained.

The compositions of main components and the amount of accessory components, which are to be added, of the dielectric resonator thus produced are shown in Table 10, the electrode material which was used, the unloaded Q value and the bond strength are shown in Table 11. The resonant frequency is 1.3 to 1.7 GHz.

TABLE 10

| Sample No. | A | B | D | x (molar fraction) | y | z | v (value) | u | Accessory component | (wt. %) |
|---|---|---|---|---|---|---|---|---|---|---|
| 188 | $Mg_{1/4}$ $Co_{1/4}$ $Zn_{1/4}$ $Ni_{1/4}$ | Nb | Sn | 0.340 | 0.520 | 0.130 | 0.010 | 0 | Sr | 0.100 |
| 189 | $Mg_{1/3}$ $Co_{1/3}$ $Ni_{1/3}$ | Ta | Sn | 0.340 | 0.520 | 0.130 | 0.010 | 1.00 | Sr | 0.100 |

TABLE 10-continued

| Sample No. | A | B | D | x (molar fraction) | y | z | v (value) | u | Accessory component | (wt. %) |
|---|---|---|---|---|---|---|---|---|---|---|
| 190 | $Mg_{1/4}$ $Co_{1/4}$ $Zn_{1/4}$ $Ni_{1/4}$ | $Nb_{1/2}$ $Ta_{1/2}$ | Sn | 0.340 | 0.520 | 0.130 | 0.010 | 1.00 | Sr | 0.100 |
| 191 | Mn | Nb | Sn | 0.200 | 0.600 | 0.190 | 0.010 | 0 | Ca | 0.100 |
| 192 | Mg | Nb | Sn | 0.300 | 0.400 | 0.200 | 0.100 | 1.00 | Sr | 0.500 |
| 193 | Mg | Nb | Sn | 0.300 | 0.400 | 0.200 | 0.100 | 1.00 | Ba | 0.500 |
| 194 | Mg | Nb | Sn | 0.300 | 0.400 | 0.200 | 0.100 | 1.00 | Ca | 0.500 |
| 195 | Mg | Nb | Sn | 0.300 | 0.400 | 0.200 | 0.100 | 1.00 | Bi | 0.500 |
| 196 | Mg | Nb | Sn | 0.300 | 0.400 | 0.200 | 0.100 | 1.00 | Ba | 0.500 |
| | | | | | | | | | Sr | 0.500 |
| | | | | | | | | | Ca | 0.500 |
| | | | | | | | | | Bi | 0.500 |
| 197 | Mg | Nb | Sn | 0.300 | 0.400 | 0.200 | 0.100 | 1.00 | Sr | 1.000 |
| | | | | | | | | | Cu | 0.005 |
| 198 | Mg | Nb | Sn | 0.300 | 0.400 | 0.200 | 0.100 | 1.00 | Sr | 1.000 |
| | | | | | | | | | Cu | 0.100 |
| 199 | Mg | Nb | Sn | 0.300 | 0.400 | 0.200 | 0.100 | 1.00 | Sr | 1.000 |
| | | | | | | | | | W | 0.005 |
| 200 | Mg | Nb | Sn | 0.300 | 0.400 | 0.200 | 0.100 | 1.00 | Sr | 1.000 |
| | | | | | | | | | W | 0.100 |
| 201 | Mg | Nb | Sn | 0.300 | 0.400 | 0.200 | 0.100 | 1.00 | Sr | 1.000 |
| | | | | | | | | | W | 1.000 |
| 202 | Mg | Nb | Sn | 0.300 | 0.400 | 0.200 | 0.100 | 1.00 | Sr | 1.000 |
| | | | | | | | | | W | 2.000 |
| 203 | Mg | Nb | Sn | 0.300 | 0.400 | 0.200 | 0.100 | 1.00 | Sr | 1.500 |
| 204 | Mg | Nb | Sn | 0.300 | 0.400 | 0.200 | 0.100 | 1.00 | Sr | 1.500 |
| 205 | Mg | Nb | Sn | 0.300 | 0.400 | 0.200 | 0.100 | 1.00 | Sr | 3.000 |
| 206 | Mg | Nb | Sn | 0.300 | 0.400 | 0.200 | 0.100 | 1.00 | Sr | 7.000 |
| *207 | Mg | Nb | Sn | 0.300 | 0.400 | 0.200 | 0.100 | 1.00 | Sr | 8.000 |
| 208 | Mg | Nb | Hf | 0.350 | 0.450 | 0.150 | 0.050 | 1.90 | Sr | 1.000 |
| 209 | Mg | Nb | Ge | 0.350 | 0.450 | 0.150 | 0.050 | 1.90 | Sr | 1.000 |

TABLE 11

| Sample No. | Electrode material | Qu | Bond strength (kg/4 $mm^2$) |
|---|---|---|---|
| 188 | Cu | 580 | 8.8 |
| 189 | Cu | 540 | 6.1 |
| 190 | Cu | 590 | 8.3 |
| 191 | Cu | 480 | 5.1 |
| 192 | Cu | 670 | 9.3 |
| 193 | Cu | 600 | 9.1 |
| 194 | Cu | 480 | 5.7 |
| 195 | Cu | 540 | 8.7 |
| 196 | Cu | 720 | 10.8 |
| 197 | Cu | 760 | 12.0 |
| 198 | Cu | 740 | 12.0 |
| 199 | Cu | 730 | 10.9 |
| 200 | Cu | 740 | 11.4 |
| 201 | Cu | 700 | 9.7 |
| 202 | Cu | 650 | 8.9 |
| 203 | Cu | 760 | 10.8 |
| 204 | Ag | 720 | 12.0 |
| 205 | Cu | 720 | 11.1 |
| 206 | Cu | 700 | 11.3 |
| *207 | Cu | 180 | 12.0 |
| 208 | Cu | 630 | 10.1 |
| 209 | Cu | 540 | 8.9 |

As is apparent from the results shown in Table 11, the dielectric resonators of the embodiment had a high bond strength also when an electroless copper electrode is used in the same way as a silver electrode. For this reason, the unloaded Q value is high in a microwave frequency band and the resonant frequency can be prevented from deviating due to electrode peeling so that electric characteristics are stable. In addition, the dielectric resonators of the invention are suitable for forming electrodes by copper plating, so that they are suitable for large scale production and manufacturing costs can be reduced.

Additionally, a $ZrTiO_4$ phase or one recognized as being a crystallographical $ZrTiO_4$ phase was confirmed by powder X-ray diffraction of a dielectric ceramic within the composition range of Example 5. It was further confirmed in composition analysis by a local X-ray diffractometer of a fracture surface and polished surface of the dielectric ceramic having as the main component $ZrTiO_4$ phase or crystallographical $ZrTiO_4$ phase that all components of Zr, Ti, A, B and D (wherein A is at least one component selected from Mg, Co, Zn, Ni and Mn, B is at least one component selected from Nb and Ta, and D is at least one component selected from Sn, Hf and Ge) were present in a single grain, and their composition ratio was consistent with the composition ratio between other grains that constitute the main phase in the same dielectric ceramic. It was also confirmed that all components A, B and D blended were present in a single grain. Moreover, it was confirmed that a dielectric ceramic with components Zr, Ti, A, B and D present in a grain which constitutes the main phase showed a higher lattice constant in comparison with $ZrTiO_4$ ceramics obtained under the same sintering conditions. Accordingly, it was confirmed that components A, B and D are substituted in the $ZrTiO_4$ phase or the crystallographical $ZrTiO_4$ phase.

Such dielectric ceramics specifically showed a high unloaded Q value and a high dielectric constant, and were superior in thermo-stability at a resonant frequency. The unloaded Q value was even higher when the molar ratio a/b of the component A to the component B was 0.5 or more and 1.9 or less. The dielectric resonators having such dielectric ceramics had an unloaded Q value which is specially high, and a high electrode bond strength.

As is apparent from the results described above, it was confirmed that the dielectric resonators of the example have the unloaded Q value which is especially high at a microwave frequency band. Moreover, the resonant frequency can be prevented from deviating due to electrode peeling. In addition, the dielectric resonators of the invention are suitable for forming electrodes by copper plating, so that they can be produced on a large scale and manufacturing costs can be reduced.

Although a dielectric ceramic having a cylindrical coaxial shape was used in Examples 4 and 5 of the invention, it is not limited to such a shape. For example, in the case of a TEM mode resonator using a dielectric ceramic having a prismatic coaxial or stepped coaxial shape, a microstrip line resonator using a dielectric resonator which has a planar shape, or a triplate resonator, an unloaded Q value which is equivalent to or more than the conventional ones can be obtained. Thus, a dielectric resonator in which stability is high and manufacturing costs are reduced can be obtained.

According to the structure of the dielectric ceramic of the invention, the variation in temperature coefficient at a resonant frequency due to heat history during sintering of $ZrTiO_4$ and $ZrO_2$—$SnO_2$—$TiO_2$ ceramics can be reduced. In addition, a high unloaded Q value is provided, and the temperature coefficient at a resonant frequency can be changed as desired without reducing the dielectric constant.

Furthermore, according to the structure of the dielectric resonator of the invention, a dielectric resonator having a high unloaded Q value and a strong electrode layer can be obtained.

The invention may be embodied in other forms without departing from the spirit or essential characteristics thereof.

The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A dielectric ceramic comprising as a main component a complex oxide formed of both Zr and Ti, at least one component selected from the group (A) consisting of Mg, Co, Zn, Ni and Mn and at least one component selected from the group (B) consisting of Nb and Ta, and as accessory components at least one component selected from the group (C) consisting of Ba, Sr, Ca, Bi and W, wherein the main component of the dielectric ceramic is expressed by the Formula: $xZrO_2$—$zA_{(1+u)/3}B_{(2-u)/3}O_2$, wherein A denotes at least one component from the group (A) consisting of Mg, Co, Zn, Ni and Mn, B denotes at least one component selected from the group (B) consisting of Nb and Ta, wherein x, y and z denote molar fractions and u denotes a value defined as follows:

$$x+y+z=1$$

$$0.10 \leq x \leq 0.60$$

$$0.20 \leq y \leq 0.60$$

$$0.01 \leq z \leq 0.70$$

$$0 \leq u \leq 1.90$$

and wherein the accessory components of the dielectric ceramic are present within the range of 0.005 to 7.000% by weight based on the entire weight of the ceramic.

2. The dielectric ceramic according to claim 1, wherein the main component comprises a $ZrTiO_4$ or crystallographical $ZrTiO_4$ phase substituted with at least one component selected from the group (A) consisting of Mg, Co, Zn, Ni and Mn and at least one component selected from the group (B) consisting of Nb and Ta.

3. The dielectric ceramic according to claim 1, wherein the main component comprises a $ZrTiO_4$ or crystallographical $ZrTiO_4$ phase substituted with at least one component selected from the group (A) consisting of Mg, Co, Zn, Ni and Mn and at least one component selected from the group (B) consisting of Nb and Ta, and a/b, where a and b denote the total of molar fractions of the components A and B, ranges from 0.5 to 1.9.

4. A dielectric resonator comprising the dielectric ceramic according to any of claim 1, and an electrode on the surface of the dielectric ceramic.

5. The dielectric resonator according to claim 4, wherein the electrode is copper or silver.

6. The dielectric resonator according to claim 5, wherein the electrode is copper.

7. A dielectric ceramic comprising as a main component a complex oxide formed of both Zr and Ti, at least one component selected from the group (A) consisting of Mg, Co, Zn, Ni and Mn, at least one component selected from the group (B) consisting of Nb and Ta, and at least one component selected from the group (D) consisting of Sn, Hf and Ge, and as accessory components at least one component selected from the group (C) consisting of Ba, Sr, Ca, Bi and W, wherein the main component of the dielectric is expressed by the Formula: $xZrO_2$—$yTiO_2$—$zA_{(1+u)/3}B_{(2-u)/3}O_2$—$vDO_2$, wherein A denotes at least one component selected from the group (A) consisting of Mg, Co, Zn, Ni and Mn, B denotes at least one component selected from the group (B) consisting essentially of Nb and Ta, and D denotes at least one component selected from the group (D) consisting of Sn, Hf and Ge, wherein x, y, z and v denote molar fractions and u denotes a value defined as follows:

$$x+y+z+v=1$$

$$0.10 \leq x \leq 0.60$$

$$0.20 \leq y \leq 0.60$$

$$0.01 \leq z \leq 0.50$$

$$0.001 \leq v \leq 0.20$$

$$0 \leq u \leq 1.90$$

and wherein the accessory components of the dielectric ceramic are present within the range of 0.005 to 7.000% by weight based on the entire weight of the ceramic.

8. The dielectric ceramic according to claim 7, wherein the main component comprises a $ZrTiO_4$ or crystallographical $ZrTiO_4$ phase substituted with at least one component selected from the group (A) consisting of Mg, Co, Zn, Ni and Mn, at least one component selected from the group (B) consisting of Nb and Ta, and at least one component selected from the group (D) consisting of Sn, Hf and Ge.

9. The dielectric ceramic according to claim 7, wherein the main component comprises a, $ZrTiO_4$ or crystallographical $ZrTiO_4$ phase substituted with at least one component selected from the group (A) consisting of Mg, Co, Zn, Ni and Mn, at least one component selected from the group (B) consisting of Nb and Ta, and at least one component selected from the group (D) consisting of Sn, Hf and Ge, and a/b, where a and b denote the total of molar fractions of the components A and B, ranges from 0.5 to 1.9.

* * * * *